United States Patent
Duan et al.

(10) Patent No.: US 8,179,807 B2
(45) Date of Patent: May 15, 2012

(54) IN-BAND COMMUNICATION OF ALARM STATUS INFORMATION IN A SYNCHRONOUS TRANSPORT COMMUNICATION SYSTEM

(75) Inventors: Cheng Gang Duan, Shanghai (CN); Lin Hua, Shanghai (CN); Michael S. Shaffer, Lynnfield, MA (US)

(73) Assignee: LSI Corporation, Milpitas, CA (US)

( * ) Notice: Subject to any disclaimer, the term of this patent is extended or adjusted under 35 U.S.C. 154(b) by 498 days.

(21) Appl. No.: 11/935,533

(22) Filed: Nov. 6, 2007

(65) Prior Publication Data

US 2009/0115596 A1    May 7, 2009

(51) Int. Cl.
G01R 31/08    (2006.01)
(52) U.S. Cl. ..................................... 370/244
(58) Field of Classification Search .......... 370/217–220, 370/221–224, 241.1, 242–246, 249–250, 370/252, 522, 389, 907, 395.51; 340/506
See application file for complete search history.

(56) References Cited

U.S. PATENT DOCUMENTS

| | | | |
|---|---|---|---|
| 5,663,949 A * | 9/1997 | Ishibashi et al. | 370/220 |
| 5,740,157 A * | 4/1998 | Demiray et al. | 370/219 |
| 6,690,644 B1 * | 2/2004 | Gorshe | 370/219 |
| 6,798,779 B1 * | 9/2004 | Shimbashi et al. | 370/395.1 |
| 6,856,594 B1 * | 2/2005 | Aihara et al. | 370/228 |
| 6,956,816 B1 * | 10/2005 | Alexander et al. | 370/222 |
| 7,079,555 B2 * | 7/2006 | Baydar et al. | 370/532 |
| 7,170,865 B2 * | 1/2007 | Jappinen | 370/310.1 |
| 7,187,649 B1 * | 3/2007 | Mazzurco et al. | 370/228 |
| 7,477,595 B2 * | 1/2009 | Saito | 370/225 |
| 2003/0002505 A1 * | 1/2003 | Hoch et al. | 370/392 |
| 2004/0240470 A1 * | 12/2004 | Medved et al. | 370/469 |
| 2006/0098660 A1 * | 5/2006 | Pal et al. | 370/395.51 |
| 2006/0268730 A1 | 11/2006 | Duan et al. | |

OTHER PUBLICATIONS

Agere Systems, "TMXF84622 Ultramapper™ 622/155 Mbits/s SONET/SDH × DS3/E3/DS2/DS1/E1/DS0," Ultramapper™ Resource Document, Jun. 6, 2002, pp. 1-250.
Agere Systems, "NSMI Enhancements for V3 Mapper Devices," Application Note, Revision 1, Jan. 11, 2005, pp. 1-11.
H. Lin et al., "Traffic Grooming in WDM SONET UPSR Rings with Multiple Line Speeds," Stanford University Publication, 2004, 12 pages.
U.S. Appl. No. 11/839,971, filed in the name of C.G. Duan et al. on Aug. 16, 2007 and entitled "Synchronous Transport Signal Mapper with Payload Extraction and insertion Functionality."

* cited by examiner

Primary Examiner — Kwang B Yao
Assistant Examiner — Jung-Jen Liu
(74) Attorney, Agent, or Firm — Ryan, Mason & Lewis, LLP

(57) ABSTRACT

Techniques are disclosed for in-band communication of alarm status information or other information between physical layer devices comprising a working device and a protection device in a network-based communication system. In one aspect, a protection receive signal is monitored in the protection device for the presence of alarm status information. The protection device encodes alarm status information extracted from the protection receive signal, and inserts the encoded alarm status information into one or more designated portions of a protection loop-back signal supplied from the protection device to the working device. The protection loop-back signal is monitored in the working device and the encoded alarm status information therein is decoded and utilized by the working device to initiate a protection switching operation.

21 Claims, 4 Drawing Sheets

| E2 VALUE | DEFINITION (PRIORITY ENCODER) |
|---|---|
| xxxx_xxxx | PROVISIONABLE VALUE |
| xxx0 0111 | LOSS OF SIGNAL (LOS) |
| xxx0 0110 | LOSS OF FRAME (LOF) |
| xxx0 0101 | LINE AIS-L |
| xxx0 0100 | SIGNAL FAIL (SF) |
| xxx0 0011 | SIGNAL DEGRADE (SD) |
| xxx0 0000 | NO ALARMS |

US 8,179,807 B2

IN-BAND COMMUNICATION OF ALARM STATUS INFORMATION IN A SYNCHRONOUS TRANSPORT COMMUNICATION SYSTEM

FIELD OF THE INVENTION

The present invention relates generally to network-based communication systems, and more particularly to mappers or other physical layer devices which process synchronous transport signals in such communication systems.

BACKGROUND OF THE INVENTION

Conventional network-based communication systems include systems configured to operate in accordance with well-known synchronous transport standards, such as the synchronous optical network (SONET) and synchronous digital hierarchy (SDH) standards.

The SONET standard was developed by the Exchange Carriers Standards Association (ECSA) for the American National Standards Institute (ANSI), and is described in the document ANSI T1.105-1988, entitled "American National Standard for Telecommunications—Digital Hierarchy Optical Interface Rates and Formats Specification" (September 1988), which is incorporated by reference herein. SDH is a corresponding standard developed by the International Telecommunication Union (ITU), set forth in ITU standards documents G.707 and G.708, which are incorporated by reference herein.

The basic unit of transmission in the SONET standard is referred to as a synchronous transport signal level-1 (STS-1). It has a serial transmission rate of 51.84 Megabits per second (Mbps).

Synchronous transport signals at higher levels may be concatenated or channelized. For example, an intermediate unit of transmission in the SONET standard is referred to as synchronous transport signal level-3, concatenated (STS-3c). It has a serial transmission rate of 155.52 Mbps. The corresponding unit in the SDH standard is referred to as STM-1. In a concatenated synchronous transport signal, the entire payload is available as a single channel. A channelized signal, by way of contrast, is divided into multiple channels each having a fixed rate. For example, the channelized counterpart to the concatenated STS-3c signal is denoted STS-3. STS-3 is a channelized signal that comprises three separate STS-1 signals each at 51.84 Mbps.

A given STS-3c or STM-1 signal is organized in frames having a duration of 125 microseconds, each of which may be viewed as comprising nine rows by 270 columns of bytes, for a total frame capacity of 2,430 bytes per frame. The first nine bytes of each row are overhead, while the remaining 261 bytes of each row are payload. The overhead includes transport overhead (TOH) and path overhead (POH). The TOH includes section overhead (SOH), pointer information, and line overhead (LOH). Additional details regarding signal and frame formats can be found in the above-cited documents.

In conventional SONET or SDH network-based communication systems, synchronous transport signals like STS-3c or STM-1 are mapped to or from corresponding higher-rate optical signals such as a SONET OC-12 signal or an SDH STM-4 signal. An OC-12 optical signal carries four STS-3c signals, and thus has a rate of 622.08 Mbps. The SDH counterpart to the OC-12 signal is the STM-4 signal, which carries four STM-1 signals, and thus also has a rate of 622.08 Mbps. The mapping of these and other synchronous transport signals to or from higher-rate optical signals generally occurs in a physical layer device commonly referred to as a mapper, which may be used to implement an add-drop multiplexer (ADM) or other node of a SONET or SDH communication system.

Such a mapper typically interacts with a link layer processor. A link layer processor is one example of what is more generally referred to herein as a link layer device, where the term "link layer" generally denotes a switching function layer. Another example of a link layer device is a field programmable gate array (FPGA). These and other link layer devices can be used to implement processing associated with various packet-based protocols, such as Internet Protocol (IP) and Asynchronous Transfer Mode (ATM), as well as other protocols, such as Fiber Distributed Data Interface (FDDI).

SONET and SDH systems support certain protection mechanisms. For example, a given system may be configured to implement automatic protection switching utilizing a 1+1 protection switching operation. In such an arrangement, incoming and outgoing optical signals at a given system node are bridged to both a working device and a protection device. The working device and the protection device are physical layer devices, such as mappers. In the event of a problem with the working device, the protection device can be switched in to take its place. Typically, the protection device and the working device both monitor the received signals. However, in order for the protection device to provide the working device with alarm status information based on received signals at the protection device, there generally must be an additional communication channel between the protection device and the working device. This increases the pin count and hardware complexity of the protection and working devices, and is therefore undesirable. A possible alternative approach is for software running on an external host processor shared by the protection and working devices to monitor alarm status from the protection device and report that alarm status to the working device. However, this type of software monitoring unduly increases the load on the host processor and can be slow and inefficient.

Accordingly, a need exists for an improved approach to communication of alarm status information from a protection device to a working device in a SONET or SDH system, particularly in those systems with 1+1 protection switching.

SUMMARY OF THE INVENTION

Illustrative embodiments of the present invention overcome the above-noted drawbacks of conventional practice by providing techniques for in-band communication of alarm status information or other types of information between a protection device and a working device in a synchronous transport communication system, such as a SONET or SDH system.

In accordance with an aspect of the invention, a protection receive signal is monitored in the protection device for the presence of alarm status information. The protection device encodes alarm status information extracted from the protection receive signal, and inserts the encoded alarm status information into one or more designated portions of a protection loop-back signal supplied from the protection device to the working device. The protection loop-back signal is monitored in the working device and the encoded alarm status information therein is decoded and utilized by the working device to initiate a protection switching operation.

In a given one of the illustrative embodiments, the one or more designated portions of the protection loop-back signal into which the encoded alarm status information is inserted comprise a designated byte of transport overhead of the protection loop-back signal, and more specifically an E2 byte of line overhead within the transport overhead. The alarm status information may comprise at least one of the following alarm status indicators: Loss Of Signal (LOS), Loss Of Frame (LOF), Alarm Indication Signal-Line (AIS-L), Signal Fail (SF) and Signal Degrade (SD). Other types of alarm status information, representative of other types of alarms, may be encoded and inserted into a protection loop-back signal in other embodiments. The alarm status information may be priority encoded utilizing a priority encoding table in which codes are assigned to the alarm status indicators in an order of increasing or decreasing priority.

The insertion of encoded alarm status information may make use of a stored indicator of a minimum amount of time that a given encoded value must be held before that value can be updated with a new encoded value if the new encoded value has a lower priority than the given encoded value. This designated minimum amount of time may be stored in a register of the protection device. The new encoded value may be compared with the given encoded value and the given encoded value may be immediately updated to the new encoded value without regard to the minimum amount of time if the new encoded value has a higher priority than the given encoded value. If the new encoded value has a lower priority than the given encoded value, the given encoded value is not updated to the new encoded value until the given encoded value has been held the minimum amount of time.

The encoded alarm status information may be decoded and utilized to initiate a protection switching operation upon detection of a designated number of consecutive consistent encoded values in the protection loop-back signal. The designated number of consecutive consistent encoded values required for decoding of alarm status information and initiation of a protection switching operation may be stored in a register of the working device.

The illustrative embodiments of the invention as described herein provide a number of significant advantages over the conventional techniques previously described. For example, by providing in-band communication of alarm status information between a protection device and a working device, the need for an additional communication channel between the protection device and the working device is avoided, and thus the device pin count and hardware complexity is not unduly increased. Also, the in-band communication of alarm status information from a protection device to a working device eliminates the need for software monitoring using a common host processor, and the associated drawbacks of that approach.

Other embodiments of the invention may provide in-band communication of various types of information other than alarm status information, and may perform functions or operations other than protection switching based on receipt of such information.

DETAILED DESCRIPTION OF THE INVENTION

The invention will be illustrated herein in conjunction with an exemplary network-based communication system which includes a physical layer device, a link layer device and other elements configured in a particular manner. It should be understood, however, that the invention is more generally applicable to any system in which it is desirable to provide improved communication of alarm status information or other types of information from a protection device to a working device in a synchronous transport communication system.

A "link layer device" as the term is used herein refers generally to a link layer processor or other type of processor which performs processing operations associated with a link layer of a network-based system.

A "physical layer device" as the term is used herein refers generally to a device which provides an interface between a link layer device and a physical transmission medium of a network-based system.

Figure 1:
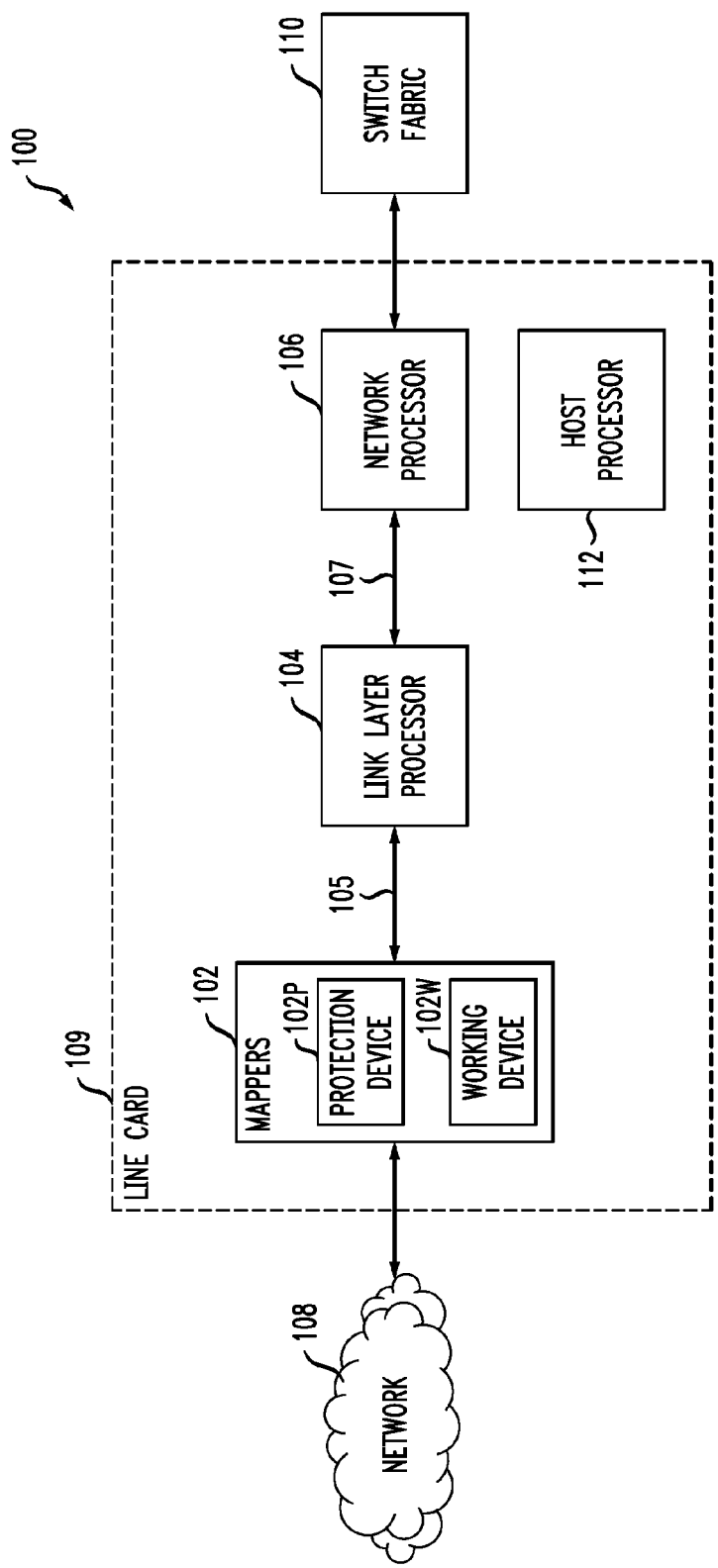
FIG. 1 is a block diagram of one possible implementation of a network-based communication system in accordance with an illustrative embodiment of the invention.

FIG. 1 shows a network-based communication system 100 in which the invention is implemented. The system 100 includes a set of mappers 102 coupled to a link layer processor 104 via an interface 105. The mappers 102 are physical layer devices suitable for providing access termination and aggregation for multiple services. One or more additional physical layer devices may be utilized in conjunction with the mappers 102, but such devices are not explicitly shown in the figure for clarity and simplicity of illustration. The link layer processor 104 is also coupled to a network processor 106, via an interface 107. The mappers 102 in this embodiment are coupled to a network 108. Examples of other types of physical layer devices that may be incorporated into the system 100 include optical transceivers for interfacing the mappers with an optical transmission medium of the network 108.

In the FIG. 1 system, the mappers 102 are configured to support 1+1 protection switching. Thus, the set of mappers as shown includes a pair of interconnected mappers, one operating as a working device 102W and the other as a protection device 102P. The manner in which the working device 102W is interconnected with the protection device 102P will be described in greater detail below in conjunction with FIG. 2. The designation of a particular one of the devices as a working device and the other as a protection device is arbitrary, as either device may serve in either capacity. However, in a given typical configuration one of the devices is designated the working device and the other is designated the protection device.

Conventional aspects of 1+1 protection switching utilizing a working device and a protection device are known in the art, and are described, for example, in the above-cited SONET/SDH standards documents. It should be noted that the term "SONET/SDH" as used herein refers to SONET and/or SDH.

The mappers 102 and link layer processor 104 may include additional functionality of a conventional type. Such additional functionality, being well known to those skilled in the art, will not be described in detail herein, but may include functionality associated with known mappers, such as the LSI Hypermapper™, Ultramapper™ and Supermapper™ devices, and known link layer devices, such as the LSI Link Layer Processor. These LSI devices are commercially available from LSI Corporation of Allentown, Pa., U.S.A. The network processor 106 may comprise, for example, a conventional network processor such as an LSI Advanced Payload-Plus® network processor in the APP300, APP500 or APP650 product family, also commercially available from LSI Corporation.

Additional details regarding conventional aspects of a SONET/SDH mapper can be found in, for example, TMXF84622 Ultramapper™ 622/155 Mbits/s SONET/SDH x DS3/E3/DS2/DS1/E1/DS0, Ultramapper™ Resource Document, Jun. 6, 2002, which is incorporated by reference herein.

The mappers 102, link layer processor 104, and network processor 106 in this illustrative embodiment are installed on a line card 109 of the system 100. The line card 109 is coupled between network 108 and a switch fabric 110 of the system 100 as shown. The link layer processor 104 and network processor 106 are configured to communicate packets, cells or other protocol data units (PDUs) between the network 108 and the switch fabric 110 which controls switching of PDU data. As indicated previously, the mappers 102 serve to interface the link layer processor 104 to physical transmission media of the network 108, which may comprise optical fiber links or any other type of transmission media.

Also installed on the line card 109 is a host processor 112. This processor is used to configure and control one or more of the other processing elements of the line card, such as the mappers 102, link layer processor 104 and network processor 106. As a more particular example, a given such host processor utilized to configure and control both the mappers 102 and the link layer processor 104 is referred to herein as a microprocessor unit (MPU). Portions of the host processor functionality may be incorporated into one or more of elements 102, 104 or 106 in alternative embodiments of the invention.

Various elements of the system 100 may be implemented, by way of example and without limitation, utilizing a microprocessor, central processing unit (CPU), digital signal processor (DSP), application-specific integrated circuit (ASIC), FPGA, or other type of data processing device, as well as portions or combinations of these and other devices.

It should be noted that the line card configuration shown in FIG. 1 is merely one example of a possible system configuration. Other embodiments can be implemented using a wide variety of other types of structural arrangements that do not involve line cards. The elements 102, 104, 106, 109, 110 and 112 in this example may be viewed as being part of a particular node of network 108 that operates in accordance with the SONET/SDH standards. Other nodes of the network 108 may of course be configured in a similar manner.

The interface 105 between the mappers 102 and the link layer processor 104 may comprise a conventional interface over which SONET/SDH signals are transmitted from the working device 102W to the link layer processor, and over which SONET/SDH signals are received by the working device from the link layer processor. Alternatively, the mappers may be equipped with payload extraction and insertion functionality, such that SONET/SDH payloads can be communicated between the mappers and the link layer device. See U.S. patent application Ser. No. 11/839,971, filed Aug. 16, 2007 and entitled "Synchronous Transport Signal Mapper with Payload Extraction and Insertion Functionality," which is commonly assigned herewith and incorporated by reference herein.

The interface 107 between the link layer processor 104 and the network processor 106 may be, for example, a conventional interface such as a SPI-3 interface as described in Implementation Agreement OIF-SPI3-01.0, "System Packet Interface Level 3 (SPI-3): OC-48 System Interface for Physical and Link Layer Devices," Optical Internetworking Forum, 2001, which is incorporated by reference herein. Other types of known interfaces, such as POS-2, may also be used.

Although the link layer processor 104 and network processor 106 are shown as separate elements in this illustrative embodiment, other embodiments may combine the functionality of the link layer processor and the network processor into a single link layer device. The general term "link layer device" as used herein is thus intended to encompass devices which incorporate at least a portion of the functionality commonly associated with a network processor.

For example, a given link layer device may be configured to provide flow control, traffic shaping and other functions. It may include an internal memory, as well as an interface to an external memory. Such memory elements may be utilized for implementing PDU buffer memory, queuing and dispatch buffer memory, etc. The link layer device may further include one or more memory controllers, as well as appropriate interface circuitry for interfacing with the mappers 102 or other physical layer device(s), the switch fabric 110, and other external devices, such as the host processor 112, which may be configured to communicate with the link layer device over a standard bus architecture, e.g., a peripheral component interconnect (PCI) bus. The link layer device may also include a scheduler, queuing and dispatch logic, as well as other conventional elements not explicitly shown in the figure. The operation of these and other conventional elements, being well understood by those skilled in the art, is not described in detail herein.

Numerous alternative interfacing arrangements are possible. It is also possible that, in other embodiments, a given link layer device may be combined with one or more physical layer devices into a single device. Thus the mappers 102 and any associated physical layer device(s) need not be physically separate from the link layer processor 104 as in the FIG. 1 embodiment, but such elements could instead be combined into a single integrated circuit or other type of processing device.

In describing the illustrative embodiment, it will be assumed that the term "ingress" refers to a direction of data transfer from the network 108 to the switch fabric 110. Similarly, it will be assumed that the term "egress" refers to a direction of data transfer from the switch fabric 110 to the network 108. It should be understood that these and other assumptions made herein are for clarity and simplicity of description only, and should not be construed as limitations of the invention. The terms "ingress" and "egress" as used herein thus do not refer to particular fixed directions, but instead may be viewed as arbitrary input and output data flow directions in a particular system implementation.

It should also be noted that the particular arrangement of system elements shown in FIG. 1 is by way of illustrative example only. More particularly, the invention can be implemented in any type of communication system having a working device, a protection device and at least one link layer device, and is not limited to the particular signal processing applications described herein. The system 100 may include other elements in addition to or in place of those specifically shown, including one or more elements of a type commonly found in a conventional implementation of such a system.

Figure 2:
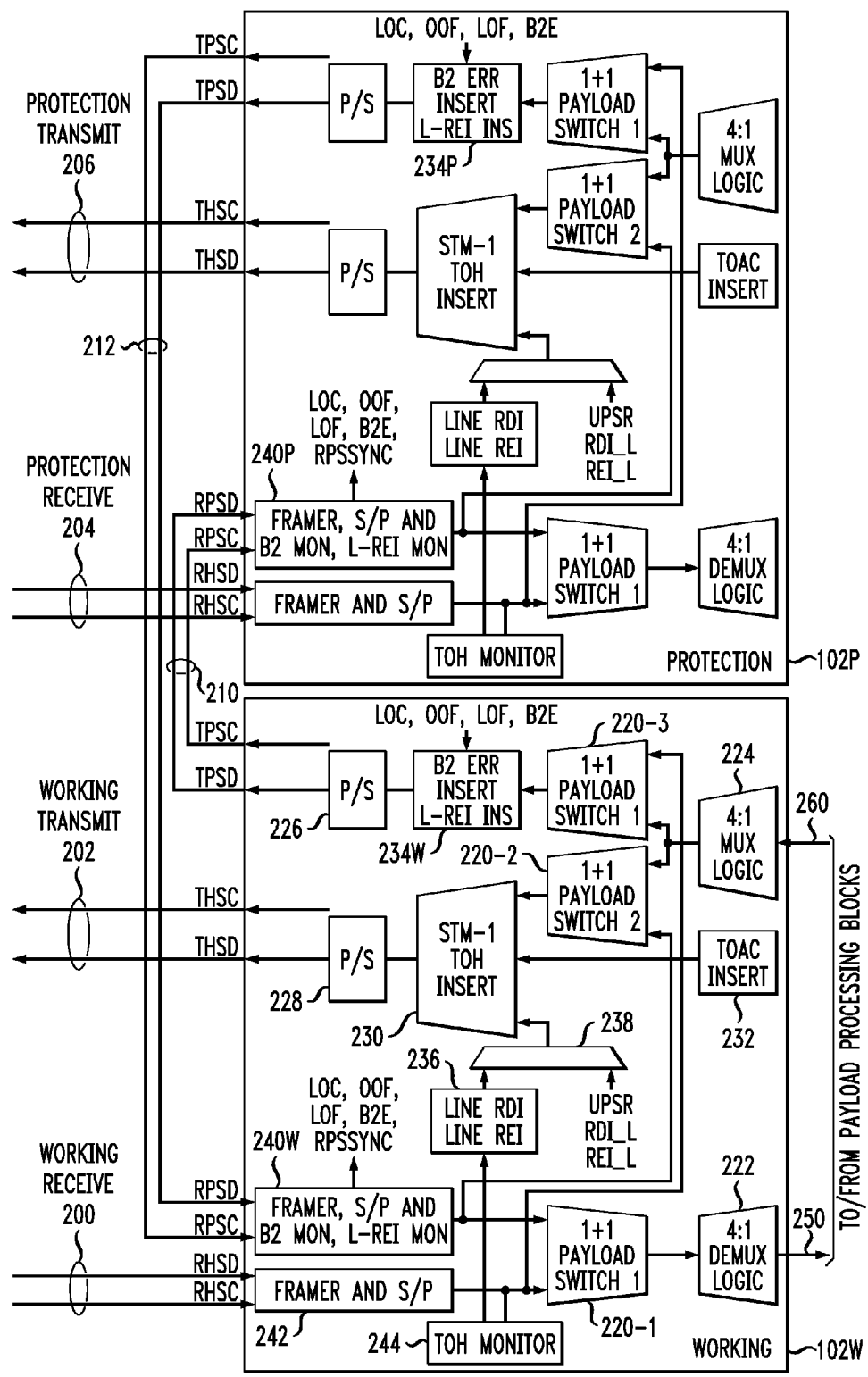
FIG. 2 is a more detailed view of a portion of the FIG. 1 system, showing exemplary implementations of a working device and a protection device providing 1+1 protection switching in the system.

FIG. 2 shows the working device 102W and protection device 102P in greater detail. Generally, the protection device is configured to monitor a protection receive signal for the presence of alarm status information, to encode the alarm status information extracted from the protection receive signal, and to insert the encoded alarm status information into one or more designated portions of a protection loop-back signal supplied from the protection device to the working device. The protection loop-back signal is then monitored in the working device and the encoded alarm status information contained in that signal is decoded and utilized to initiate a protection switching operation. In this embodiment, the encoded alarm status information is inserted into a designated byte of the TOH of the protection loop-back signal, and more particularly into an E2 byte of LOH within the TOH.

It should be noted that the interface between the working device 102W and the protection device 102P in the illustrative embodiment may be implemented as a bidirectional interface. Thus, it is possible for alarm status information to move between both devices simultaneously. The following description of FIG. 2 will focus on the communication of alarm status information from the protection device to the working device, for simplicity and clarity of illustration, although it should be understood that similar techniques may be used to communicate alarm status information from the working device to the protection device.

The working device 102W as shown in FIG. 2 receives in the ingress direction working receive signals via signal lines 200 and transmits in the egress direction working transmit signals via signal lines 202. Similarly, the protection device 102P receives in the ingress direction protection receive signals via signal lines 204 and transmits in the egress direction protection transmit signals via signal lines 206. The working and protection receive signals include Receive High Speed Clock (RHSC) and Receive High Speed Data (RHSD). The working and protection transmit signals include Transmit High Speed Clock (THSC) and Transmit High Speed Data (THSD). These signals may be respective data and clock signals associated with a SONET OC-12 synchronous transport signal.

The working device 102W also has a protection transmit interface (TPSD/TPSC) coupled to a protection receive interface (RPSD/RPSC) of the protection device 102P via signal lines 210, over which signals are transmitted from the working device to the protection device. Similarly, the protection device has a protection transmit interface coupled to a protection receive interface of the working device via signal lines 212, over which signals are transmitted from the protection device to the working device. The signals transmitted over the signal lines 210, 212 are examples of what are more generally referred to herein as loop-back protection signals. The receive clock should be used for the TPSD/TPSC interface.

The working device 102W and protection device 102P in this embodiment are generally configured with substantially the same set of circuitry. This circuitry in the working device includes 1+1 protection switches 220-1, 220-2 and 220-3, a 1:4 demultiplexer 222, a 4:1 multiplexer 224, parallel-to-serial converters 226 and 228, insertion elements 230, 232, 234 and 236, a 2:1 multiplexer 238, and additional circuitry elements 240, 242 and 244. The insertion element 234 implements an E2 byte encoder. Element 240 is an alarm status information monitor that implements an E2 byte monitor.

The insertion element 232 is more particularly identified as a Transport Overhead Access Channel (TOAC) insertion element in this embodiment. The insertion element 234 receives as its inputs, among other signals, indicators associated with Loss Of Clock (LOC), Out-Of-Frame (OOF) and B2 Errors (B2E). The insertion element 236 provides line Remote Defect Indicator (RDI) and line Remote Error Indicator (REI) insertion. Multiplexer 238 receives, in addition to its inputs supplied by insertion element 236, inputs associated with Unidirectional Path Switched Ring (UPSR). Element 240 generates, among other outputs, a receive protection synchronization (RPSSYNC) signal.

Each of the elements in the working device 102W has a corresponding element in the protection device. Elements 234 and 240 in the working device are more specifically identified as 234W and 240W, respectively, in order to distinguish such elements in the description below from the corresponding elements 234P and 240P in the protection device.

The circuitry elements in a given one of the working and protection devices may be generally characterized as collectively comprising transmit circuitry and receive circuitry. It is to be appreciated that numerous alternative arrangements of circuit elements may be utilized in implementing such transmit and receive circuitry in a given embodiment of the invention.

The working device 102W receives a working receive signal via signal lines 200. The working device demultiplexes the working receive signal using demultiplexer 222 into component signals for delivery to payload processing blocks via output 250. Similarly, component signals received via input 260 from payload processing blocks are multiplexed using multiplexer 224 to form a working transmit signal for transmission over signal lines 202. The switches 220-1, 220-2 and 220-3 are appropriately configured in a straightforward manner to provide these desired signal throughputs. The working receive and transmit signals may be, for example, OC-12 signals, each having four component STS-3 signals. As indicated previously, the corresponding SDH signals are denoted STM-1 and STM-4, respectively. Of course, other types of synchronous transport signals may be used in implementing the invention.

The protection device 102P receives a protection receive signal via signal lines 204. The protection device monitors the protection receive signal for alarm status information. This alarm status information may comprise, for example, line or unit alarm status indicators such as Loss Of Signal (LOS), Loss Of Frame (LOF), Alarm Indication Signal-Line (AIS-L), Signal Fail (SF) and Signal Degrade (SD) indicators. It is to be appreciated that these are just illustrative examples, and the invention is not limited to use with any particular type of alarm status information. Also, the term "alarm status information" as used herein is intended to be construed broadly, so as to encompass, for example, other types of indicators that may be used to trigger a protection switching operation in a SONET/SDH mapper or other physical layer device.

As noted above, insertion element 234P of the protection device implements an E2 byte encoder. The E2 byte encoder is configured to perform priority encoding of the alarm status information detected in the protection receive signal into corresponding E2 values, in the manner shown in the encoding table of FIG. 3. A given provisionable value in this embodiment is a single byte, or eight bits, of the form xxxx_xxxx. The alarms are encoded in order of decreasing priority. For example, with reference to the table, an E2 value of xxx0_0111 indicates the highest priority alarm, which is an LOS alarm, while an E2 value of xxx0_0011 indicates the lowest priority alarm, namely, an SD alarm. The E2 value of xxx0_0000 indicates no alarms. A wide variety of alternative encoding techniques may be used, and the term "encoding" as used herein is therefore intended to be broadly construed.

A given E2 value for a particular detected alarm is inserted into the E2 byte of the LOH in the TOH of an STS-1 signal to be transmitted as part of a protection loop-back signal from the protection device to the working device over signal lines 212. The working device monitors the protection loop-back signal in an E2 byte monitor implemented in element 240. Any encoded alarm status detected in the protection loop-back signal is decoded and can be utilized to initiate a protection switching operation. For example, if the E2 byte monitor in element 240 indicates an LOS alarm, the working device can initiate an appropriate protection switching operation. This may involve configuring switch 220-1 such that the protection loop-back signal is selected in place of the working receive signal for further processing in the working device. Other types of protection switching operations can also be supported.

Figures 3, 4:
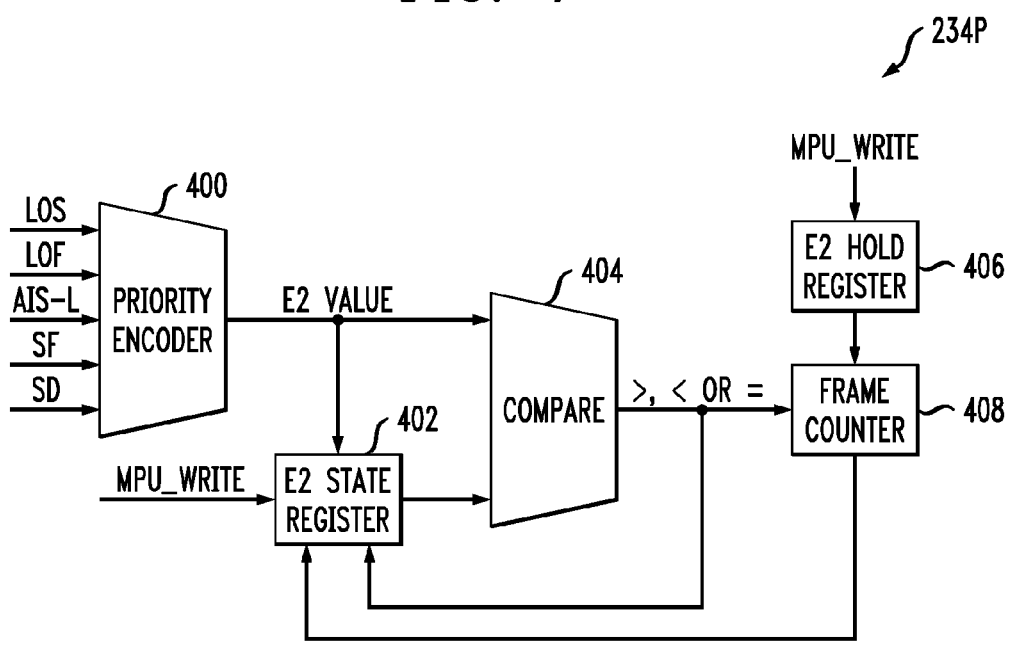
FIG. 3 shows an example of an encoding table utilized by an encoder in the protection device to encode alarm status information for in-band communication to the working device in the FIG. 1 system.
FIG. 4 shows an insertion element with alarm status information encoder as implemented in the protection device of the FIG. 1 system.

FIG. 4 shows a more detailed view of a portion of the insertion element 234P of the protection device 102P. This portion of the insertion element comprises a priority encoder 400 for encoding the alarm status indicators LOS, LOF, AIS-L, SF and SD into respective E2 values in the manner described above. The insertion element also includes an E2 state register 402, a comparison element 404, an E2 hold register 406, and a frame counter 408.

Upon detection of a given alarm, the corresponding input of the priority encoder 400 is asserted and the appropriate new E2 value is generated and applied to one input of the comparison element 404. The other input of the comparison element receives an existing E2 value that has already been stored in the E2 state register 402. The E2 hold register 406 stores an indicator of a minimum amount of time that a given E2 value stored in the E2 state register 402 must be held before that value can be updated with a new E2 value. This time indicator controls the frame counter 408, which in conjunction with the output of the comparison element controls the updating of the E2 state register. A write signal MPU_WRITE from the above-noted MPU is also applied to the registers 402, 406.

The comparison element compares the new E2 value to the existing E2 value stored in the E2 state register. If the new E2 value has a lower priority than the existing E2 value, then the existing E2 value will not be updated until it has been held for the amount of time specified in the E2 hold register. If the new E2 value has a higher priority than the existing E2 value, then the existing E2 value will be updated immediately to the new E2 value. Once the hold time has expired for a given E2 value stored in the E2 state register, any other monitored alarm status can immediately update the E2 state register.

Figure 5:
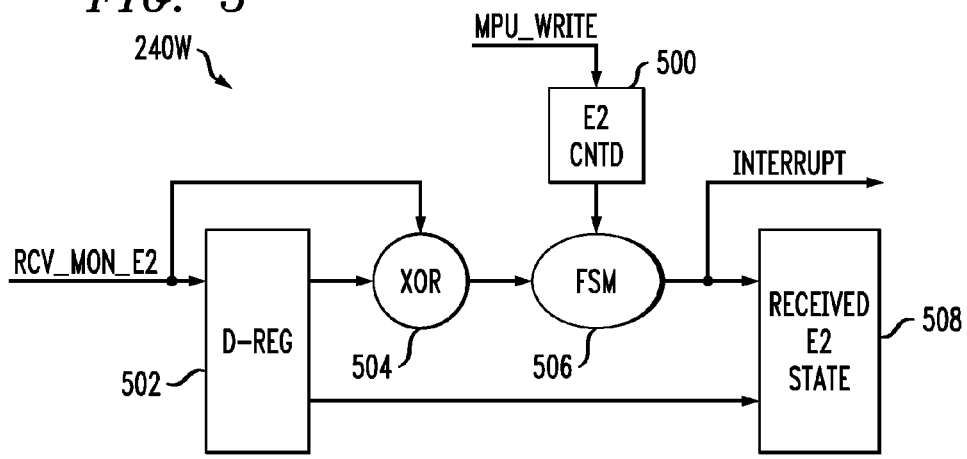
FIG. 5 shows an alarm status information monitor implemented in the working device of the FIG. 1 system.

FIG. 5 shows a more detailed view of alarm status information monitor 240W implemented in the working device 102W of the FIG. 1 system. The monitor includes an E2 counted register 500, a buffer 502, an exclusive-or (XOR) gate 504, a finite state machine (FSM) 506, and a received E2 state register 508. The buffer 502, also denoted as D-REG, receives an input signal RCV_MON_E2. This input signal is also applied to the XOR gate 504. The E2 counted register 500 is controlled by the previously-mentioned MPU_WRITE signal. Outputs of the buffer 502 and the FSM 506 are applied to corresponding inputs of the received E2 state register 508. The output of the FSM is also utilized as an interrupt.

In this embodiment, the received E2 state as stored in register 508 will not change until a designated number of consistent E2 values have been received, with the designated number being stored in the E2 counted register 500. By way of example, the E2 counted register may store a value between 0 and 7, with 0 denoting that the E2 monitor is off, 1 denoting that the monitor will capture every change in E2 value, 2 denoting that the monitor will capture a change in E2 value after two consecutive consistent values, and so on.

Figure 6:
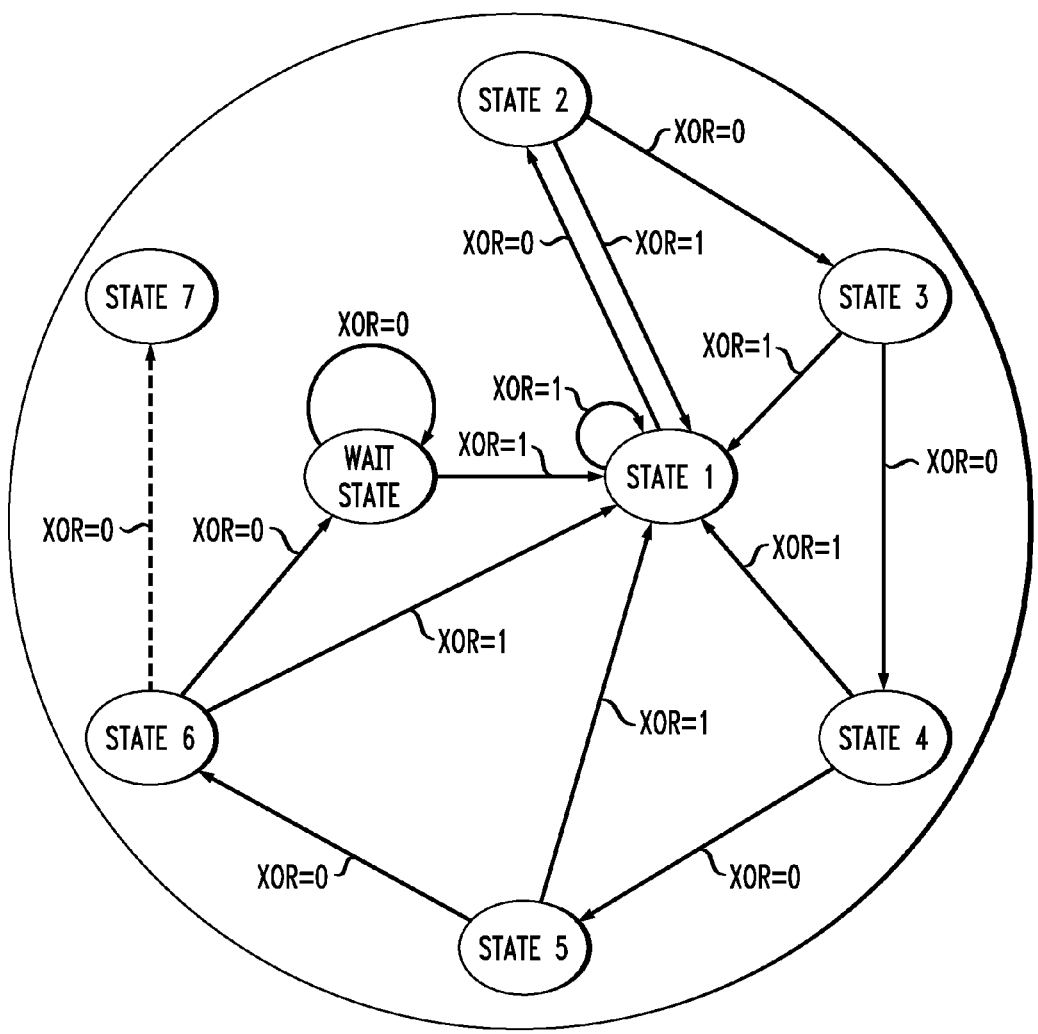
FIG. 6 is a state diagram for a finite state machine implemented in the alarm status information monitor of FIG. 5.

FIG. 6 shows a state diagram of the FSM 506 for an implementation in which the E2 counted register 500 stores a value of 6, that is, the monitor will capture a change in E2 value after six consecutive consistent values. Thus, the received E2 state as stored in register 508 will not change until 6 consecutive consistent E2 values have been received.

The FSM as shown in FIG. 6 includes a Wait state and six other states denoted State 1 through State 6. It is assumed that the FSM enters the Wait state after a reset of the monitor 240W of the working device 102W. In the Wait state, the monitor does not generate an interrupt and does not update the E2 value as stored in the received E2 state register 508. Upon receipt of the first E2 value after a reset, the FSM transitions to State 1 and the incoming E2 value is buffered in buffer 502.

If the second received E2 value is the same as the first one buffered in buffer 502, then the output of the XOR 504 will be a logic zero, and the FSM will transition from State 1 to State 2. Otherwise it will remain in State 1. The second received E2 value is buffered in the buffer 502 in place of the first E2 value.

Assume that the second E2 value was the same as the first and a third E2 value is received. If the third received E2 value is the same as the second one buffered in buffer 502, then the output of the XOR 504 will be a logic zero, and the FSM will transition from State 2 to State 3. Otherwise it will return to State 1. The third received E2 value is buffered in the buffer 502 in place of the second E2 value.

This process continues for the remaining states, with the FSM transitioning from one state to the next if the corresponding received E2 value is the same as the previous one (XOR=0), and otherwise returning to State 1 (XOR=1).

After six consecutive consistent E2 values have been received, the FSM will be in State 6. At this point, the received E2 state register 508 is updated to store the current E2 value and an interrupt is asserted. The interrupt provides an indication to the working device that a protection switching operation should be initiated.

From State 6, another received E2 value that is the same as the previous one (XOR=0) will result in a return to the Wait state. If the other received E2 value is different than the previous one (XOR=1), the FSM will return to State 1. The process then continues for additional received E2 values in the manner previously described.

An optional additional state may be used, designated as State 7 in the diagram, in place of a return to the Wait state.

The illustrative embodiments described above allow 1+1 protection switching operations to be performed in the working device 102W based on alarm status information detected in the protection device 102P and transmitted in-band between the protection device and the working device. The alarm status information can include alarm indicators such as LOS, LOF, AIS-L, SF, SD and others. Use of in-band transmission of such information between a protection device and a working device is faster and more efficient than software monitoring, and avoids the increased pin count and hardware complexity that would be associated with providing an additional communication channel between the protection and working devices. The illustrative embodiments allow the working device to obtain information characterizing both the working and protection signals, resulting in more efficient protection switching. Also, various features of the alarm status encoding and monitoring processes are configurable via registers, allowing the techniques to be readily adapted to the particular needs of different applications.

It is to be appreciated that the particular arrangements of circuitry shown in FIGS. 2, 4 and 5 are merely exemplary, and numerous alternative circuitry arrangements may be used to implement the in-band alarm status communication techniques disclosed herein.

Alternative embodiments of the invention can utilize the above-described in-band communication techniques to carry information other than alarm status information. Any type of information can be shared between the working device and the protection device using this in-band communication mechanism, and such information can be used to perform functions or operations other than those associated with protection switching. The particular type of information carried by an in-band communication channel can be, for example, programmed under software, firmware or hardware control.

As mentioned above, alarm status information or other types of information can move simultaneously between both the working device and the protection device. Thus, the interface provided by the in-band communication channel may be bidirectional.

Also, as indicated previously, the invention does not require the use of the E2 byte. For example, any other unused byte or bytes within the SONET/SDH overhead section could be used.

A mapper or other working or protection device in accordance with the invention may be implemented as an integrated circuit device suitable for installation on a line card or port card of a router or switch. For example, the working and protection devices described above may be implemented as separate integrated circuits. It is also possible that the working and protection devices, or portions thereof, may be implemented as a single integrated circuit. Numerous other configurations are possible.

In a given integrated circuit implementation, identical die are typically formed in a repeated pattern on a surface of a semiconductor wafer. Each die includes at least a portion of a mapper or other physical layer device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, it should be emphasized that the embodiments of the invention as described herein are intended to be illustrative only. For example, the particular arrangement of physical layer devices, link layer device, network processor and other elements as shown in FIG. 1 may be varied in alternative embodiments. Also, the particular encoding and monitoring processes shown in the drawings and described above are presented by way of example, and those skilled in the art will recognize that alternative encoding and monitoring arrangements may be used. Furthermore, other types of circuitry may be used to implement alarm status encoding and monitoring operations as disclosed herein. These and numerous other alternative embodiments within the scope of the following claims will be readily apparent to those skilled in the art.

What is claimed is:

1. A method of communicating alarm status information between physical layer devices comprising a working device and a protection device in a network-based communication system, the method comprising the steps of:
monitoring a protection receive signal in the protection device for the presence of alarm status information;
encoding alarm status information extracted from the protection receive signal; and
inserting the encoded alarm status information into one or more designated portions of a protection loop-back signal supplied from the protection device to the working device;
wherein the protection loop-back signal is monitored in the working device and the encoded alarm status information therein is decoded and utilized to initiate a protection switching operation.

2. The method of claim 1 wherein the working and protection devices comprise SONET/SDH mappers.

3. The method of claim 1 wherein the one or more designated portions of the protection loop-back signal into which the encoded alarm status information is inserted comprises a designated byte of transport overhead of the protection loop-back signal.

4. The method of claim 3 wherein the designated byte of transport overhead comprises an E2 byte of line overhead within the transport overhead.

5. The method of claim 1 wherein the alarm status information comprises at least one of the following alarm status indicators: Loss Of Signal (LOS), Loss Of Frame (LOF), Alarm Indication Signal-Line (AIS-L), Signal Fail (SF) and Signal Degrade (SD).

6. The method of claim 1 wherein the step of encoding alarm status information further comprises the step of priority encoding one of a plurality of alarm status indicators utilizing a priority encoding table in which codes are assigned to the alarm status indicators in an order of increasing or decreasing priority.

7. The method of claim 1 wherein the step of inserting encoded alarm status information further comprises storing an indicator of a minimum amount of time that a given encoded value must be held before that value can be updated with a new encoded value if the new encoded value has a lower priority than the given encoded value.

8. The method of claim 7 wherein the step of inserting encoded alarm status information further comprises comparing the new encoded value with the given encoded value and immediately updating the given encoded value to the new encoded value without regard to the minimum amount of time if the new encoded value has a higher priority than the given encoded value.

9. The method of claim 7 wherein the step of inserting encoded alarm status information further comprises comparing the new encoded value with the given encoded value and not updating the given encoded value to the new encoded value until the given encoded value has been held the minimum amount of time if the new encoded value has a lower priority than the given encoded value.

10. The method of claim 1 wherein the encoded alarm status information is decoded and utilized to initiate a protection switching operation upon detection of a designated number of consecutive consistent encoded values in the protection loop-back signal.

11. A protection device configured for communication with a working device, the protection and working devices comprising physical layer devices of a network-based communication system, the protection device comprising:
receive circuitry configured to monitor a protection receive signal for the presence of alarm status information; and
transmit circuitry coupled to the receive circuitry and configured to encode alarm status information extracted from the protection receive signal and to insert the encoded alarm status information into one or more designated portions of a protection loop-back signal supplied from the protection device to the working device;
wherein the protection loop-back signal is monitored in the working device and the encoded alarm status information therein is decoded and utilized to initiate a protection switching operation.

12. The protection device of claim 11 wherein said protection device comprises a SONET/SDH mapper.

13. The protection device of claim 11 wherein said protection device is implemented in the form of an integrated circuit.

14. A working device configured for communication with a protection device, the working and protection devices comprising physical layer devices of a network-based communication system, the working device comprising:
receive circuitry configured to monitor a protection loop-back signal received from the protection device for encoded alarm status information inserted into one or more designated portions of the protection loop-back signal by the protection device and to decode the encoded alarm status information; and
transmit circuitry coupled to the receive circuitry and configured to initiate a protection switching operation responsive to the decoded alarm status information.

15. The working device of claim 14 wherein said working device comprises a SONET/SDH mapper.

16. The working device of claim 14 wherein said working device is implemented in the form of an integrated circuit.

17. A method of communicating information between physical layer devices comprising a working device and a protection device in a network-based communication system, the method comprising the steps of:
monitoring a protection receive signal in the protection device for the presence of specified information;
encoding specified information extracted from the protection receive signal; and
inserting the encoded specified information into one or more designated portions of a protection loop-back signal supplied from the protection device to the working device;
wherein the protection loop-back signal is monitored in the working device and the encoded specified information therein is decoded for use in the working device.

18. A node of a network-based communication system, said node comprising:
a plurality of physical layer devices comprising a working device and a protection device; and
a link layer device coupled to at least one of the physical layer devices;
wherein the protection device comprises:
receive circuitry configured to monitor a protection receive signal for the presence of alarm status information; and
transmit circuitry coupled to the receive circuitry and configured to encode alarm status information extracted from the protection receive signal and to insert the encoded alarm status information into one or more designated portions of a protection loop-back signal supplied from the protection device to the working device;
wherein the protection loop-back signal is monitored in the working device and the encoded alarm status information therein is decoded and utilized to initiate a protection switching operation.

19. The node of claim 18 wherein said working device and protection device comprises respective integrated circuits.

20. A network-based communication system, said system comprising:
a plurality of interconnected nodes;
wherein at least a given one of said nodes comprises:
a plurality of physical layer devices comprising a working device and a protection device; and
a link layer device coupled to at least one of the physical layer devices;
wherein the protection device comprises:
receive circuitry configured to monitor a protection receive signal for the presence of alarm status information; and
transmit circuitry coupled to the receive circuitry and configured to encode alarm status information extracted from the protection receive signal and to insert the encoded alarm status information into one or more designated portions of a protection loop-back signal supplied from the protection device to the working device;
wherein the protection loop-back signal is monitored in the working device and the encoded alarm status information therein is decoded and utilized to initiate a protection switching operation.

21. The system of claim 20 wherein the one or more designated portions of the protection loop-back signal into which the encoded alarm status information is inserted comprises a designated byte of transport overhead of the protection loop-back signal.

* * * * *